Jan. 13, 1959     E. J. NIEMEYER     2,867,938
TRAP FOR ANIMALS
Filed Dec. 19, 1955     2 Sheets-Sheet 1
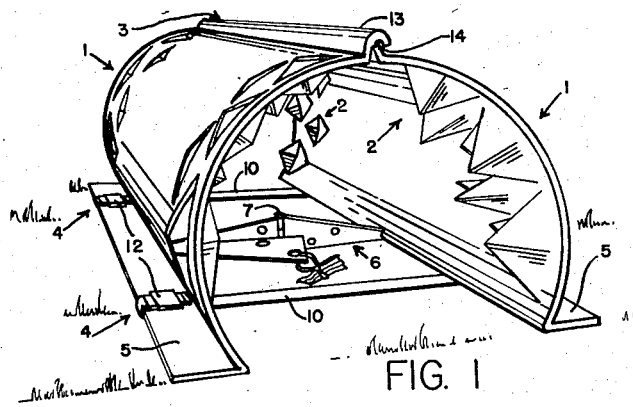
FIG. 1
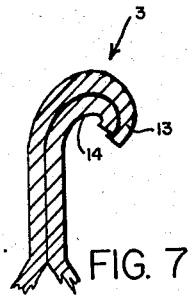
FIG. 7
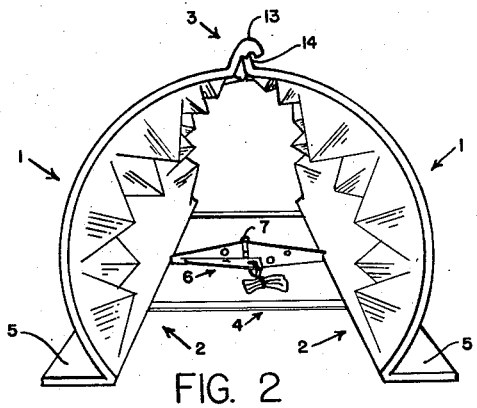
FIG. 2
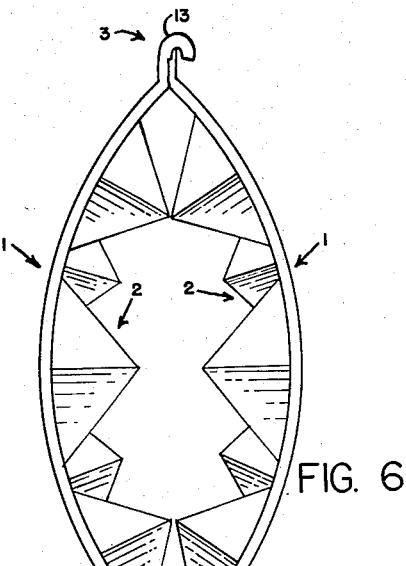
FIG. 6
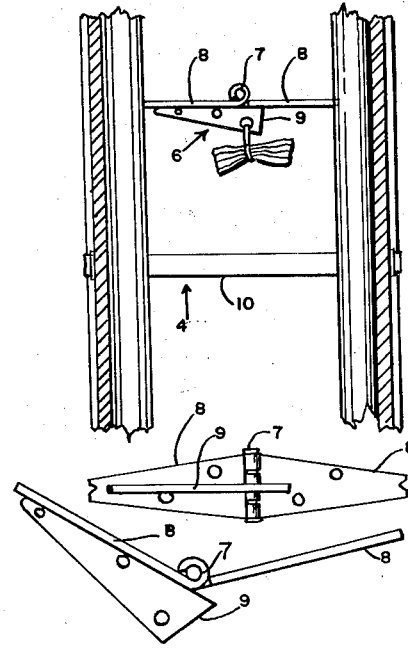
FIG. 3
FIG. 4
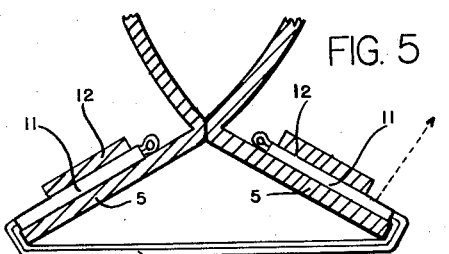
FIG. 5
INVENTOR.
EDWARD J. NIEMEYER
BY R. W. Hodgson

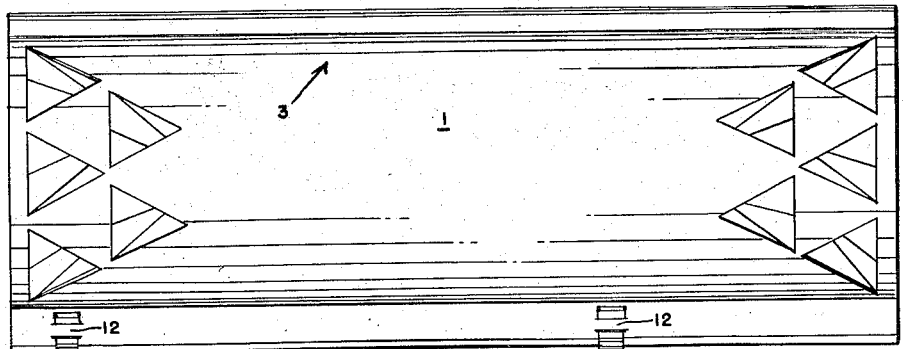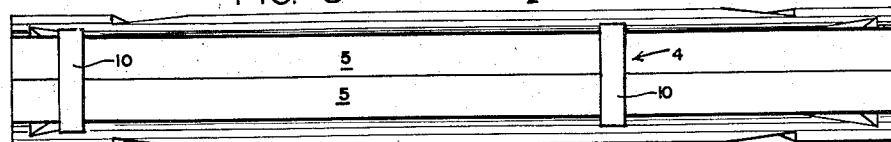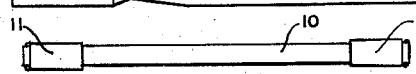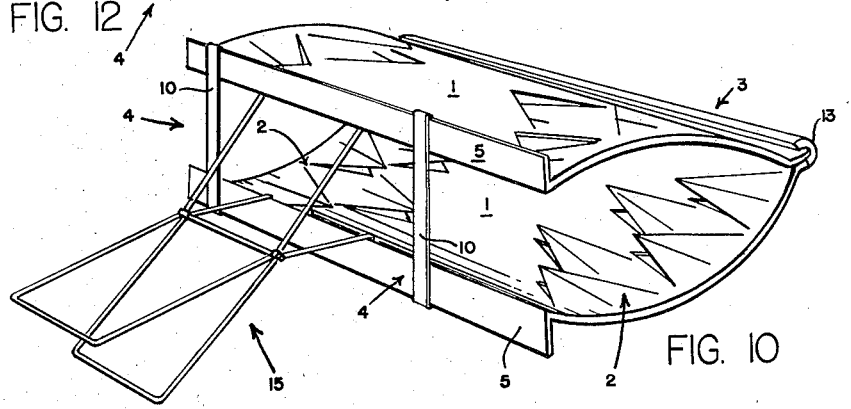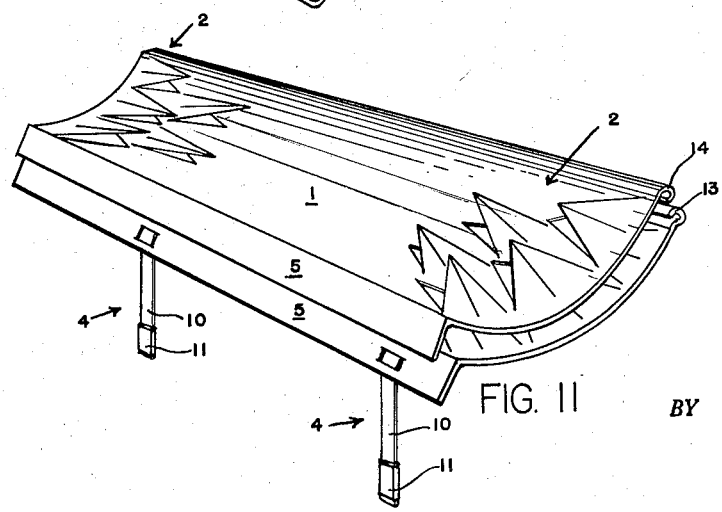
INVENTOR.
EDWARD J. NIEMEYER
BY R.W. Hodgson

United States Patent Office 2,867,938
Patented Jan. 13, 1959

2,867,938

TRAP FOR ANIMALS

Edward J. Niemeyer, Maricopa, Calif.

Application December 19, 1955, Serial No. 553,964

13 Claims. (Cl. 43—63)

This invention relates to a device for trapping game or other small animals.

It is the general object of the present invention to provide a superior means for accomplishing the function of trapping animals.

A specific object of the present invention is to provide a means whereby the trapped animal is protected from other predators.

Another specific object of the present invention is to provide a trapping means from which the animal cannot escape by chewing off or otherwise tearing off a limb.

It is yet a further object of the present invention to provide an easily portable trap. A further object of the present invention is to provide a trap which is easily and safely set.

The features of the present invention which are believed to be novel are set forth with particularity in the appended claims. This invention itself, both as to its organization and manner of operation together with further objects and advantages thereof, may be best understood by reference to the following description taken in connection with the accompanying drawings in which:

Figure 1 is a perspective view looking partly at one side and partly into the end of the trap in its set or open position;

Figure 2 is a view looking directly into the end of the trap in its open position and showing the manner in which the sides of the trap are held open;

Figure 3 is a fragmentary section taken horizontally through the trap just above the tripping means;

Figure 4 is an enlarged detail view of the tripping means;

Figure 5 is a fragmentary section taken vertically through the trap and showing a detail view of the spring means which closes the trap;

Figure 6 is an end elevation of the trap in its closed position;

Figure 7 is an enlarged fragmentary vertical section comprising a detail view of the hinge means used in the present embodiment of the invention;

Figure 8 is a side elevation of the trap in its closed position;

Figure 9 is a view of the underside of the trap in its closed position;

Figure 10 illustrates the operation of the trap in loading;

Figure 11 illustrates the manner of storing the element of the trap for ease in carrying the trap from place to place; and Figure 12 illustrates the spring means used to close the trap in the present embodiment of this invention.

Briefly the trap consists of two sides which form an enclosure when their corresponding edges are brought together; hinge means for hinging these sides together along one of their edges so that the trap may be opened or closed; spring means for drawing the said sides toward one another; and tripping means for preventing the said spring means from drawing said sides together until said tripping means are disturbed and for allowing the said sides to come together as soon as the tripping means are disturbed.

In the present embodiment of this invention, the side elements are curved sheets of metal whose ends are furnished with spikes. When the trap is sprung the concave surfaces of these curved sheets form the sides of an enclosure. The animal is prevented from escaping from the ends of this enclosure by the spikes.

In operation, the trap is loaded by inserting the tripping means between its open edges. The tripping means will hold these edges apart until an animal attempts to take the bait which is attached to the tripping means. When an animal does so, the tripping means will collapse or be pulled from between the edges so that it no longer holds them apart with the result that the sides of the trap will now come together and form a closed chamber which prevents the animal from escaping. Should the animal attempt to escape at the ends, the spikes will prevent him. Should other animals attempt to reach the animal in the trap, the sides of the trap will keep them away.

Reference is now made to the embodiment of the invention shown in the figures. In the embodiment shown in ¾ perspective view in Figure 1, the two sides 1 of the trap are formed by bending rectangular pieces of sheet metal into arcs. The spikes 2 at the ends of each side are formed by making an angular cut with the apex of the angle pointing toward the center of each side and then pushing the resulting section of metal inward.

The hinge 3 which connects the two sides is a hinge of the disconnect type. This is, as soon as the hinge is opened beyond a certain point, the two sides come apart. This makes for greater ease in assembling and disassembling the trap.

The spring means 4 in this embodiment consists of an elastic band whose ends are selectively removably fastened to the open edges of the trap in such a manner as to make the assembling operation as rapid and as simple as possible. It will also be seen that the open edges 5 of the sides of the trap are bent outward so as to rest flat on the ground and so as to hold the spring means 4 as will be described further below.

The tripping means 6 in this embodiment of the invention, as can be seen from Figures 1, 2, 3 and 4, consists of a hinge element to which is connected a stopping element to which the bait is attached in such relationship that pulling on the bait tends to close the hinge, thereby allowing the edges of the trap to close.

Figure 2 is a view looking into the open end of the trap and shows the trap as it would be seen by the animal with the bait lying in the center. In operation, the trap would be placed with the entrance opening onto a game trail and the animal would enter the trap, pull the bait outward, as it is shown in Figure 2, thereby closing the hinge and allowing the trap to close.

Figure 3 shows the construction of the tripping means 6 and its relation to the rest of the trap. The tripping means consists of a hinge element and a stopping element which prevents the sides of the hinge from opening more than slightly over 180 degrees. When the sides of the hinge element are in this position, the stopping element prevents the edges of the trap from forcing the sides of the hinge element together.

The bait is attached to the stopping element. When the bait is pulled or the stopping element is otherwise disturbed, the stopping element causes the sides of the hinge element to move through the 180 degree position toward some smaller angle. There is then nothing to prevent the hinge element from closing and the sides are pushed completely together by the edges of the trap as they close.

Figure 4 illustrates the construction of tripping means in further detail, particularly with regard to the relation between the hinge element (comprising the hinge 7 and the hinge sides 8) and the stopping element 9.

Figures 5 and 12 illustrate the construction and operation of one of the spring elements of the present embodiment of the invention. The element illustrated in Figure 12 consists of an elastic band 10 having each end stiffened by encasing it in a ferrule 11 of a rigid material. In the present embodiment of this invention this material is a galvanized metal. Other materials, such as plastics, for example, could be used equally well.

Figure 5 is a fragmentary section which shows how this elastic spring means is connected to the edges of the trap. It will be seen that since the edge of each side of the trap is bent outward, the portion of the elastic band which has been encased in the stiff furrule need merely be passed through a holding means 12 on the outer surface of the bent edge 5 (such means tending to hold it parallel to the surface) and the force of the elastic will tend to pull it outward against the holding means and thus hold it in position.

In the present embodiment of this invention, this holding means is extremely simple. The sheet metal in the bent portion 5 at the edge of each side is simply slit twice and the strap 12 so formed is raised outward from the surface of the metal sufficiently far to allow the ferruled end 11 of the elastic band 10 to pass under it. No more complex means are needed to hold the elastic 10, since the force on the ferrule 11 is in the direction of the broken line arrow of Figure 5 and tends to pull it against the raised portion of the sheet metal strap 12 rather than through the opening made for the purpose of inserting (and selectively removing) this ferruled end 11 of the elastic 10.

Figure 6 is a view looking into the end of the trap when it is in a sprung position and shows how the elastic operates to hold the trap closed.

Figure 7 is a cross section showing a detail of the disconnect hinge 3 used in the trap. This hinge is made by bending the edge 13 of one of the sides into an arc and bending the corresponding edge 14 of the other side into an arc of slightly smaller radius, and providing the arc 13 with covering end flanges.

When the bent edge 14 is placed within the bent edge 13, the two edges co-act as a hinge. When this hinge is opened, as can be seen from Figure 7, beyond a certain point, the two sides will come apart. For this reason, the hinge may be easily assembled and disassembled.

Figure 8 is a side elevation of the trap in the closed position and shows clearly the manner of forming the spikes which prevent the animal from escaping. In the present embodiment of this invention it can be seen that an angle cut is made with the apex of the angle toward the center of the track and the spike is then formed by pushing the resulting section of sheet metal inwardly, thus resulting in the spikes 2.

Figure 9 is a bottom view of the trap in a closed position and shows the edges 5 bent outward with the elastic means 10 holding the trap closed.

Figure 10 shows the method of setting the trap with the two sides connected together by the disconnect hinge 3 and the elastic 10 in position, the open edges 5 of the trap are pushed apart using a setting tool, indicated generally at 15. This setting tool 15 is an expanding pliers made by bending each of two side members into an angle and connecting them together pivotally at the apex of the angle so that, as the portions of the side elements below the pivot are drawn together, those above the pivot will be pulled apart. When the setting tool 15 has separated the edges 5 of the trap, the tripping device 6 may be safely inserted and the setting tool 15 may then be removed.

Figure 11 illustrates the manner of stacking the separated sides 1 of the trap in order to carry a large number of traps in a compact package. Since the side elements 1 of the traps are similar curved surfaces and since the spikes 2 are formed by pushing out sections of the sheet metal, the sides may be stacked up quite compactly. One concave section in such stacking fits into the next and the spikes of each side, as can be seen from Figure 11, fit into the holes associated with the spikes in the side immediately above.

Incidentally it should be noted that various other obstruction means (comprising anti-egress means) may be employed in lieu of the spikes specifically described and illustrated. Also various other spring means (and means for holding same) may be employed.

The exact compositions, configurations, constructions, relative positionings, and cooperative relationships of the various component parts of the present invention are not critical, and can be modified substantially within the spirit of the present invention.

The embodiment of the present invention specifically described and illustrated herein is exemplary only, and is not intended to limit the scope of the present invention, which is to be interpreted in the light of the prior art and the appended claims only, with due consideration for the doctrine of equivalents.

I claim:

1. A device for trapping animals consisting of two independent side elements so formed as to create an enclosure when their corresponding edges are brought together; selectively disengageable hinge means pivotally connecting said side elements together adjacent similar edges thereof so that said side elements are free to move into an open position in which the enclosure is not complete and into a closed position in which the enclosure is complete; said selectively disengageable hinge means consisting of a first curved lip carried along the edge of one side element and a second smaller curved lip carried along the adjacent edge of the opposite side element, said second smaller curved lip being pivotally mounted within said first curved lip and being selectively disengageable therefrom when pivotally opened beyond a predetermined point; selectively disengageable spring means; said side elements and said spring means being provided with selectively disengageable holding and engaging means connecting said spring means to said side elements so as to force said side elements into said closed position; and tripping means associated with said side elements in such a way as to prevent said side elements from moving into said closed position until said tripping means is disturbed and then in such a way as to allow said elements to assume said closed position; said side elements being separable by selective disengagement of said selectively disengageable hinge means and by selective disengagement of said selectively disengageable spring means and being substantially congruently curved and positionable in relatively reversed compact interfitting convex-outside-to-concave-inside stacked relationship.

2. A device of the character defined in claim 1 for trapping animals, wherein said spring means consists of at least one elastic band with opposite ends thereof provided with said engaging means; and wherein said holding means is carried by each side element, said elastic band being biasingly cooperable with respect to said side elements by selective engagement of said engaging means with respect to said holding means.

3. A device of the character defined in claim 1 for trapping animals, wherein said spring means consists of longitudinally spaced elastic bands with at least certain of the band ends being stiffened by corresponding ferrules comprising said engaging means; and wherein a plurality of said holding means are carried by said side elements, at least certain ends of said elastic bands being selectively removably cooperable with at least certain of the holding means carried by said side elements by selective removable positioning of the corresponding ferruled ends in engagement with the corresponding holding means.

4. A device of the character defined in claim 1 for trapping animals, wherein certain edges of said side elements are outwardly bent, said spring means consists of longitudinally spaced elastic bands with opposite ends of each band being stiffened by a corresponding metal ferrule comprising said engaging means; and wherein a plurality of said holding means are longitudinally spaced on the outer surface of each side element, each of said elastic bands being selectively removably passed over the outwardly bent edges of said side elements, and said ferruled ends being selectively removably positioned at least partially through the corresponding holding means carried by each side element in similar locations.

5. A device of the character defined in claim 1 for trapping animals, wherein said tripping means consists of a hinge element and a stopping element mounted on one side of said hinge element and so positioned as to prevent sides of said hinge element from opening more than slightly over 180 degrees but as to allow said hinge element to close substantially completely when sides of said hinge element move to a less-than-180-degrees position; said stopping element also being cooperable for holding the bait so that when the bait is taken or said stopping element is otherwise disturbed, sides of said hinge element will be moved from a more-than-180-degrees position through a 180-degrees position and said hinge element will be allowed to close.

6. A device of the character defined in claim 5 for trapping animals, wherein said spring means consists of at least one elastic band with opposite ends thereof provided with said engaging means; and wherein said holding means is carried by each side element, said elastic band being biasingly cooperable with respect to said side elements by selective engagement of said engaging means with respect to said holding means.

7. A device of the character defined in claim 5 for trapping animals, wherein said spring means consists of longitudinally spaced elastic bands with at least certain of the band ends being stiffened by corresponding ferrules comprising said engaging means; and wherein a plurality of said holding means are carried by said side elements, at least certain ends of said elastic bands being selectively removably cooperable with at least certain of the holding means carried by said side elements by selective removable positioning of the corresponding ferruled ends in engagement with the corresponding holding means.

8. A device for trapping animals consisting of two curved side elements: a selectively disengageable hinge pivotally connecting said curved side elements together adjacent similar edges of said side elements; said selectively disengageable hinge consisting of a first curved lip carried along the edge of one side element and a second smaller curved lip carried along the adjacent edge of the opposite side element, said second smaller curved lip being pivotally mounted within said first curved lip and being selectively disengageable therefrom when pivotally opened beyond a predetermined point; selectively disengageable spring means; said side elements and said spring means being provided with selectively disengageable holding and engaging means connecting said springs means to adjacent opposite edges of said curved side elements and tending to draw them together; tripping means placed between the open edges of said side elements tending to hold them apart; said side elements being separable by selective disengagement of said selectively disengageable hinge and by selective disengagement of said selectively disengageable spring means and being substantially congruently curved and positionable in relatively reversed compact interfitting convex-outside-to-concave-inside stacked relationship; obstruction means located adjacent the ends of said side elements thereby providing spaced antiegress means at each end of the enclosure created when the tripping means is removed and the spring means closes the open edges of said side elements of said device.

9. A device of the character defined in claim 8 for trapping animals, wherein said spring means consists of at least one elastic band with opposite ends thereof provided with said engaging means; and wherein said holding means is carried by each side element, said elastic band being biasingly cooperable with respect to said side elements by selective engagement of said engaging means with respect to said holding means.

10. A device of the character defined in claim 8 for trapping animals, wherein certain edges of said side elements are outwardly bent, said spring means consists of longitudinally spaced elastic bands with opposite ends of each band being stiffened by a corresponding metal ferrule comprising said engaging means; and wherein a plurality of said holding means are longitudinally spaced on the outer surface of each side element, each of said elastic bands being selectively removably passed over the outwardly bent edges of said side elements, and said ferruled ends being selectively removably positioned at least partially through the corresponding holding means carried by each side element in similar locations.

11. A device of the character defined in claim 8 for trapping animals, wherein said obstruction means consists of a plurality of spikes located adjacent opposite ends of said sides and pointed inwardly substantially toward the longitudinal and transverse center of the enclosure; and wherein said spring means consists of longitudinally spaced elastic bands with at least certain of the band ends being stiffened by corresponding ferrules comprising said engaging means; and wherein a plurality of said holding means are carried by said side elements, at least certain ends of said elastic bands being selectively removably cooperable with at least certain of the holding means carried by said side elements by selective removable positioning of the corresponding ferruled ends in engagement with the corresponding holding means.

12. A device of the character defined in claim 8 for trapping animals, wherein said tripping means consists of a hinge element and a stopping element mounted on one side of said hinge element and so positioned as to prevent sides of said hinge element from opening more than slightly over 180 degrees but as to allow said hinge element to close substantially completely when sides of said element move to a less-than-180-degrees position; said stopping element also being cooperable for holding the bait so that when the bait is taken or said stopping element is otherwise disturbed, sides of said hinge element will be moved from a more-than-180-degrees position through a 180-degree position and said hinge element will be allowed to close.

13. A device of the character defined in claim 12 for trapping animals, wherein said spring means consists of longitudinally spaced elastic bands with at least certain of the band ends being stiffened by corresponding ferrules comprising said engaging means; and wherein a plurality of said holding means are carried by said side elements, at least certain ends of said elastic bands being selectively removably cooperable with at least certain of the holding means carried by said side elements by selective removable positioning of the corresponding ferruled ends in engagement with the corresponding holding means.

References Cited in the file of this patent

UNITED STATES PATENTS

| | | |
|---|---|---|
| 246,240 | Symonds | Aug. 23, 1881 |
| 1,479,853 | Gambee | Jan. 8, 1924 |
| 1,871,157 | Clayton | Aug. 9, 1932 |
| 2,525,383 | Troutman | Oct. 10, 1950 |